United States Patent
Levasseur

[15] 3,688,086
[45] Aug. 29, 1972

[54] CHECK DIGIT AND TRANSACTION AUTHORIZATION SYSTEM

[72] Inventor: Joseph L. Levasseur, St. Louis, Mo.

[73] Assignee: Simcom Corporation, High Ridge, Mo.

[22] Filed: Oct. 28, 1970

[21] Appl. No.: 84,817

[52] U.S. Cl.....235/61.7 B, 235/61.11 E, 340/149 A, 340/146.2
[51] Int. Cl. ..............................................G06r 5/00
[58] Field of Search......235/61.7 A, 61.7 B, 61.11 E; 340/146.2, 149 A

[56] References Cited

UNITED STATES PATENTS

| | | |
|---|---|---|
| 3,254,201 | 5/1966 | Miller....................235/61.7 B |
| 3,136,979 | 6/1964 | Perotto.................235/61.7 A |
| 3,184,714 | 5/1965 | Brown, Jr. et al. .....340/146.2 |
| 2,482,242 | 9/1949 | Brustman............235/61.11 E |

*Primary Examiner*—Thomas A. Robinson
*Attorney*—Charles B. Haverstock

[57] ABSTRACT

A system for operating on the digits of an identifier such as an account number represented in a coded form by a constant ratio code, said system including means which operate by some preestablished formula to determine if the identifier is a valid identifier and/or has been properly entered, said system also providing a way to verify that persons who use the system have in fact actually used it as they are supposed to and used it properly each time. The present system therefore provides means for evaluating the performance and reliability of those who use equipment in the extending of credit and for other purposes. The programming of the subject system can be varied from time to time to prevent users of the system from being able to outsmart or by-pass use of the system even when making later transactions involving the same identifiers or account numbers.

19 Claims, 4 Drawing Figures

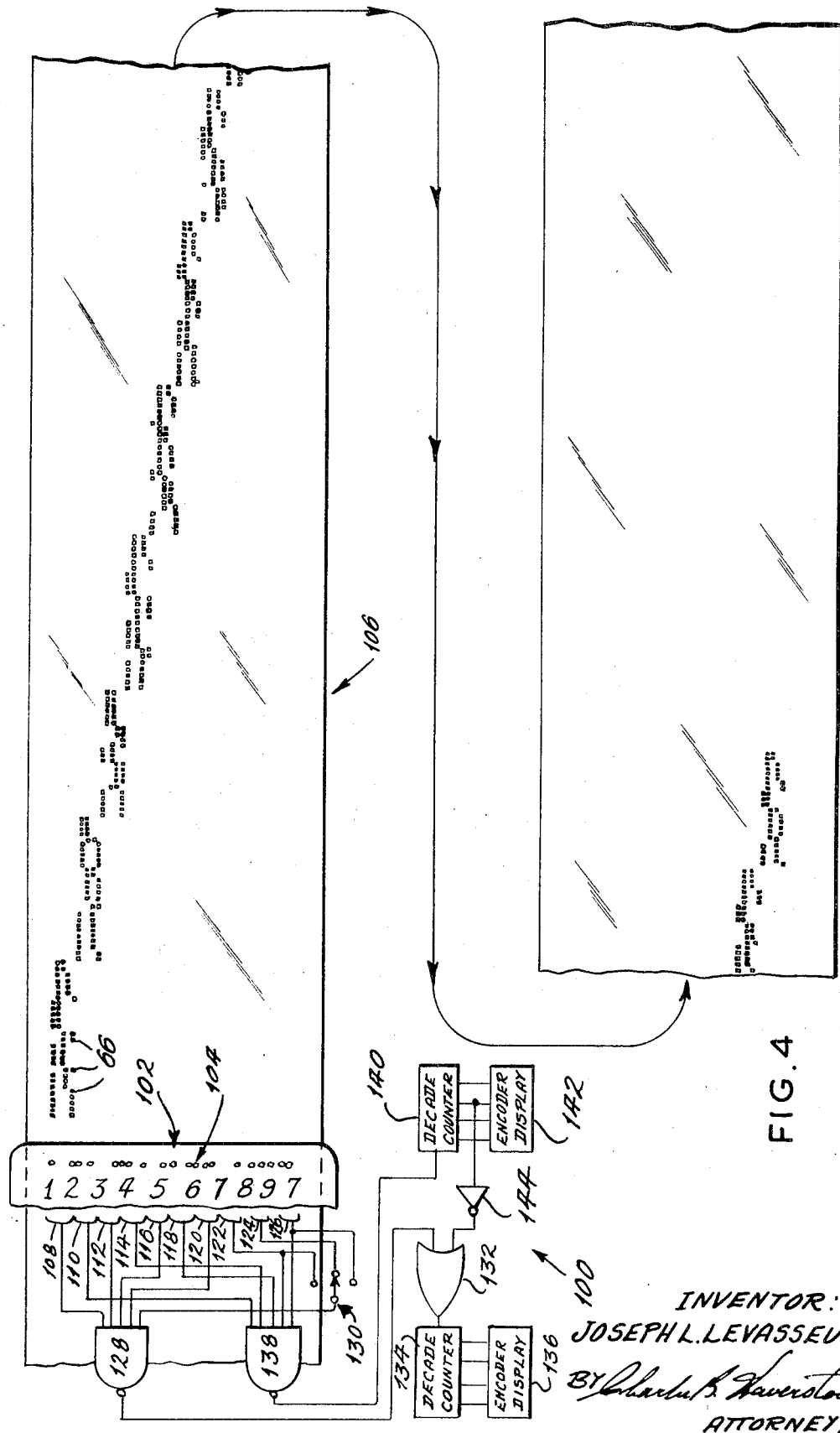

CHECK DIGIT AND TRANSACTION AUTHORIZATION SYSTEM

Various check digit and credit authorization systems have been devised and utilized heretofore but none, so far as known, make use of a coded record medium such as a strip of optically encoded microfilm or other similar optically encoded means in various operations to determine if an identifier is valid for some purpose and has been dialed or entered properly, and no known system includes means by which it is possible to check on the performance and reliability of sales and other persons including particularly persons who extend credit to people who present credit cards or other devices which have identifiers such as account numbers assigned to them. Use of the subject check digit and transaction authorization means can be made to take place automatically and quickly with little or no special effort or extra operations being required by the persons using them, and they can be incorporated for use with related systems that make use of the same or similar coded identifiers or account numbers. For example, the present system can be incorporated for use with the credit validation means disclosed in applicant's U. S. Pat. No. 3,581,063, issued May 25, 1971, and this can be accomplished with relatively little modification of the basic system and without requiring any extra work by the system operators.

The subject system can be used with any identifier or number in coded or other form and preferably a coded form that can be read or detected by optical detection means. The identifiers may in one application be the account numbers assigned to holders of credit cards or other identification devices, and the encoded identifiers can be numbers, alphanumeric identifications, alphabetic identifications, or any identification in symbolic or other form that can be encoded. It is usually necessary at some point for the system user or sales person to enter the identifier into the system in some way such as the ways described in applicant's U.S. Pat. No. 3,581,063. This can be done by using a perforated credit card, by positioning or dialing a plurality of encoded movable slides or by other like means. This is done to enable optical or similar reading or detection means to sense and/or compare each coded identifier with other similarly or complementary encoded identifiers so that outputs indicative of an optical comparison are produced which can then be used to determine if the identifier is a valid identifier and to provide other outputs which can be used and/or recorded to determine if the operator actually used the system. The information made available by the present system is usually in addition to other information such as information as to whether a particular identifier or account number is one that is acceptable or known to be unacceptable for some reason such as belonging to a credit card that is known to be lost, stolen or otherwise in the hands of an unauthorized person.

As indicated above, for the subject system to operate it is necessary for the operator or sales person to enter the identifier or account number either by placing a perforated card in the device or by dialing or otherwise entering the identifier in it. Thereafter, when the device is operated the system will automatically determine by the check digit means to be described, whether the identifier is or is not a good identifier. The calculations and manipulations by which this and other determinations are made can be varied widely and this specification will describe only one of the many possibilities.

In the check digit operation described, manipulations will be made on some or all of the digits of the identifier or account number to arrive at a result or answer which when combined or compared in some manner with the check digit, which is one of the digits of the entered identifier, will produce an output to indicate either that the identifier as entered is an acceptable or unacceptable identifier for some reason. The identifier may be unacceptable for various reasons including the fact that it may be entered erroneously, or it may be a fictitious or counterfeit identifier. The means by which this determination is arrived at are the heart of the check digit portion of the present system. All possible digit combinations of the identifier or account numbers will produce a distinctive check digit which will depend on the outcome of the manipulations that are performed. If an identifier has been entered properly the check digit manipulations will be satisfied and it can then be safely assumed that the identifier is acceptable for the various other purposes to be performed on it such as to thereafter in the same continuous operation verify that the identifier is or is not acceptable for some other purpose such as for extending credit to the person presenting a credit card bearing that identifier and so forth. In its preferred form the subject check digit system includes means for automatically optically reading or sensing the digits of the account number of other identifier so that the necessary computations or manipulations can be performed.

The companion transaction authorization portion of the subject invention operates in a manner somewhat similar to the digit check portion and can occur automatically usually before or after the check digit operation as part of the same continuous operation. Transaction authorization is used mainly to check on the reliability of the operator to make sure that he or she is actually using the system and using it properly. It can also be used for other purposes including gaining access to particular information and so forth. This portion of the system involves making other manipulations on the digits of the identifier or account number in such a way as to produce a visual or other output indication usually represented as an output indicator in the form of one or more digits which the operator is required to enter on a sales slip or other document each time he uses the machine so that this indicator can later be used to determine whether the operator used the machine and used it properly. The identifier that the operator is required to enter is uniquely related to the identifier or account number that is on the credit card or other device. This therefore provides a verifiable indication for later determining whether the operator used the machine and used it properly. The number that the operator enters on the sales slip is based on preestablished calculations that can be varied from time to time so that the operator or sales person has no way of knowing in advance or of determining what the identifier will be except by actually using the machine. The means in the subject machine by which the identifier that is to be entered is determined include circuits such as gate circuits and the like which operate on the various digits of the account number usually individually as they are sensed by optical sensing means as will be explained. It is to be expected that each different account number will produce a distinctive output identifier based on calculations involving its individual digits, which identifier is to be entered on the sales slip.

It is a principal object of the present invention to provide means for verifying that a person operating a machine into which he enters information has made the entries accurately and that the information entered is acceptable information.

Another object is to provide means by which it can be verified that a machine operator is using the equipment he is provided with.

Another object is to provide relatively simple means for verifying the accuracy of each entry into a machine.

Another object is to provide means to verify that each identifier or account number entered into a machine for some purpose is a proper and acceptable identifier or account number before reliance is placed on other operations made thereon.

Another object is to provide means to automatically establish the correctness or incorrectness of each identifier entered into a machine before the machine performs other operations thereon.

Another object is to employ optical sensing means in the performance of check digit and transaction authorization operations.

Another object is to perform calculations on the digits of an identifier in order to produce a recordable indication for later use to verify whether machine entries have been made accurately.

Another object is to provide means for evaluating the performance of machine operators and particularly persons who operate machines used in credit transactions.

Another object is to minimize the possibility of a machine operator making false entries or failing to use a machine.

Another object is to improve the accuracy and acceptability of machine operations especially in sales and credit transactions.

Another object is to reduce losses which occur in credit and other transactions especially where the purchasers present credit cards and like devices.

Another object is to minimize the chances for making entry errors where information is entered into a machine for some purpose.

These and other objects and advantages of the present invention will become apparent after considering the following detailed specification which covers several embodiments thereof in conjunction with the accompanying drawings, wherein.

Figure 1:
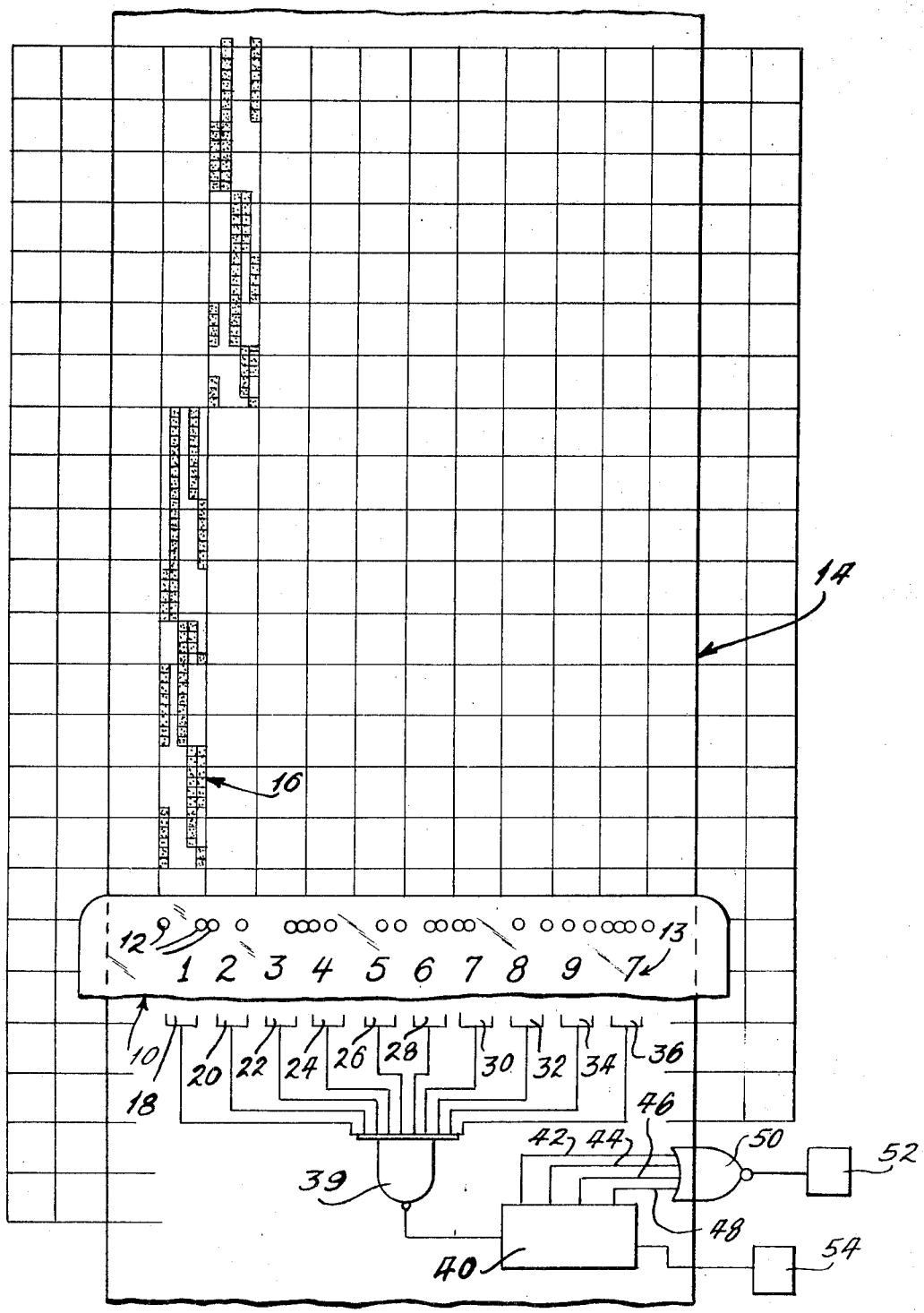
FIG. 1 is a top plan view showing a credit card having holes position encoded therein to represent an account number and a check digit number, and a piece of transparent film having opaque areas position encoded thereon, said view also showing circuit means for use in performing a check digit operation.

The means described in this specification cover improvements to a device such as the validation device disclosed in copending Levasseur U. S. application Ser. No. 787,648, filed Dec. 30, 1968, now U.S. Pat. No. 3,581,063, issued May 25, 1971. In the earlier case, means are disclosed for comparing an identifier such as an account number assigned to a particular credit card with a listing of account numbers in encoded form on a film strip to see if the particular account number is included in the listing. The listing on the film strip may include all of the account numbers of a particular company that are known to be objectionable for some reason, such as by being assigned to credit cards that are known to be lost or stolen. The coded listing can also represent "good guy" numbers which are all of the account numbers that are known to be acceptable. In either case, each account number or other identifier entered into the machine, either manually or by means of a perforated credit card or the like, is optically compared to all of the numbers included in the listing which are encoded on the film strip, and if the entered account number compares optically with one of the encoded numbers, this will be indicated in some way. In one case, it will indicate that the credit card is probably in the hands of an unauthorized person, and in the other, it will indicate that the card is in the hands of a "good guy." The optical means for making these comparisons as the film strip moves through the machine are disclosed in Levasseur U.S. Pat. No. 3,581,063 and as such are not part of the present invention.

The present check digit and transaction authorization means are designed to be incorporated into a device such as the device covered by the earlier Levasseur patent to increase its usefulness and reliability by providing means to verify that each identifier or account number that is entered is in proper form and is properly entered, and also to verify that the person charged with using the machine did in fact use it and used it properly. Both of these operations are performed without any extra effort by the operator and by means which perform mathematical manipulations on the various digits of each account number that is entered. Some of the results of these manipulations are combined or compared with the check digit which is usually part of the account number, and other results produce an output number which the machine operator records for later use in evaluating the operator and/or the machine performance. If the mathematical manipulations establish that an account number is an acceptable account number and is entered properly, then the machine will also be programmed to perform its other principal operations which may include the other optical comparisons necessary to determine such things as whether or not it is all right to extend credit to a person presenting a credit card and so forth.

If the operator inadvertently or otherwise erroneously enters an account number into the machine or if the number entered for some other reason is an unacceptable number, the mathematical manipulations which are performed on its digits will not come out right with the check digit, and this will be indicated so that the operator can rectify the situation or take such other action as may be called for. During the same operation of the machine other mathematical manipulations will also be made on the various digits of the account number to produce an output indication usually in the form of one or more numbers or symbols which the operator records on the sales slip or other document, and which can be used during later processing to determine if the operator or sales person actually operated the machine and if so, whether it was done accurately. For example, if the operator or sales person correctly enters an account number, and thereafter records the output indication produced by the machine onto the sales slip, this information can be later verified and processed. On the other hand, if the operator enters a wrong indication or uses the machine improperly for some reason, this can be later determined and can be used in evaluating the operator's performance and reliability and the accuracy of the work product. The construction and operation of the check digit portion including the calculations made thereby in a typical case will be described in connection with FIGS. 1 and 2, and the construction and operation of the transaction authorization portion will be described thereafter.

Referring to FIG. 1 by reference numbers, number 10 refers to a credit card or similar device having a plurality of holes or perforations 12 position encoded therein to represent the digits of an account number 13 or other identifier. The positions of each two adjacent holes are located in five possible hole positions necessary to encode each number digit of the account number 13. This form of encoding is sometimes referred to as a two-out-of-five constant ratio code. For example, the account number 13 which is assigned to the credit card 10 is the number 1234567897, where the first nine digits represent the account number and the last digit is the check digit. Each digit of the account number 13, as shown, is positioned adjacent to the two holes in the card which are position encoded to represent it. The first digit, which is the digit 1, is represented by holes in the first and fifth hole positions, the second digit which is the digit 2 is represented by holes in the first and fourth hole positions, the next digit which is digit 3 is represented by holes in the fourth and fifth hole positions, and so on across the credit card. This form of constant ratio code can be varied to accommodate letters and/or numbers, and the choice of hole positions which represent each digit depends on an arbitrary assignment. If, for example, the code were to be expanded to cover alphanumeric information a three-out-of-seven constant ratio code would probably be used and so on.

Extending behind the credit card 10 in FIG. 1 is a film strip 14 shown as being a transparent film strip which has position encoded opaque areas or dots 16 located thereon. Only part of that portion of the film 14 which is used for the check digit operation is shown in FIG. 1. The total film strip may also include a transaction authorization portion, a machine operations control portion, a listing of coded account numbers, and other control and operational marks for various purposes. In the usual situation, however, the list of other account numbers or identifiers will usually occupy by far the largest portion of the film strip, and the controls portions including the check digit, transaction authorization and other control portions will be duplicated at or near each opposite end of the film and will represent a relatively small portion thereof. This is done so that these portions will be read ahead of the main body of data regardless of the direction of movement of the film through the machine. This also facilitates operation of the machine for both directions of movement of the film thereby saving time and eliminating the necessity for rewinding the film. Also, in the particular film embodiment shown in FIG. 1, the dots 16 on the film strip are arranged in parallel rows and columns across and along the film and it is usually preferred to have the rows which extend across the film be at some angle relative to the transverse dimension of the film as in the construction shown in the Levasseur patent identified above. This is done so that relatively narrow film widths such as 8, 16 and 35 millimeter films can be used while at the same time keeping the dot size and row lengths reasonable for the purposes intended. By using standard film sizes considerable cost saving is also obtained. Also, the coding of the dots 16 on the film strip is complementary to the coding of the holes 12 so that light will be blocked and prevented from passing through only when a matched condition occurs in a digit position as will be explained.

During movement of the film strip 14 past the read station which in FIG. 1 is where the encoded holes 12 in the credit card 10 are located, the dot rows on the film move past the holes 12 and produce a direct optical comparison between the dots in each row and the row of holes in the card. Whenever the dots in any one row or digit position on the film strip simultaneously block the holes in the credit card in the corresponding digit position so that momentarily no light can pass through, this means that the number in that digit position of the card has been found. By the same token, if light can get through in any one or more of the possible positions it means there is a difference between the compared digits.

A light sensor unit such as disclosed in U.S. Pat. No. 3,581,063 is provided to sense the light or absence of light that is able to pass through the card and film strip. The light sensing unit includes one or more light sensors such as the sensors 18–36 which are positioned to respond to light from a light source 38 that is positioned on the opposite side of the film strip and card therefrom. Each of the sensors 18–36 in the device as shown is positioned to sense only that light that passes through the two-out-of-five possible hole positions necessary to represent one of the digits of the account number 13. For example, the light sensor 18 is in the first digit position and responds to any light or the absence thereof that passes through either of the two holes used to represent the first digit of the account number as the film moves thereby. Similarly, the light sensor 20 responds to any light that passes through either of the two holes which represent the second digit, and so on for the other sensors 22–36. In the preferred form, the film strip 14 is transparent and the dots 16 are opaque so that only when all of the holes in the card simultaneously register with dots on the film in the same positions will light be momentarily prevented from reaching all of the sensors thereby indicating a matched condition. As long as any light can pass through any one or more of the holes in the credit card and an aligned transparent portion of the film no matched condition will exist. It can therefore be seen that during a normal search operation some light will always be able to reach at least one of the sensors except when a matched condition exist at all of the sensor positions. The check digit and transaction authorization means disclosed herein operate on a somewhat similar principal except they only read one digit position at a time during movement of the associated portion of the film strip thereby instead of reading the entire account number, and in so doing are able to produce a number of outputs depending on an established arrangement as will be explained, which outputs are accumulated or counted and used in making certain necessary calculations.

The film strip 14 may also include synchronizing and control pulses located along or adjacent to one or both side edges of the film to control and/or synchronize the reading times to the film strip and in some cases to control the film speed. During the check digit and transaction authorization portions of the operating cycle a plurality of matched conditions are detected as will be explained and each such matched condition will be fed as an impulse or output signal to one of a plurality of input terminals of a circuit which is shown as Nand gate 39. The Nand gate 39 because of its inherent construction will produce an output everytime it receives an input on any one of its input terminals and these outputs will be accumulated.

Figure 2:
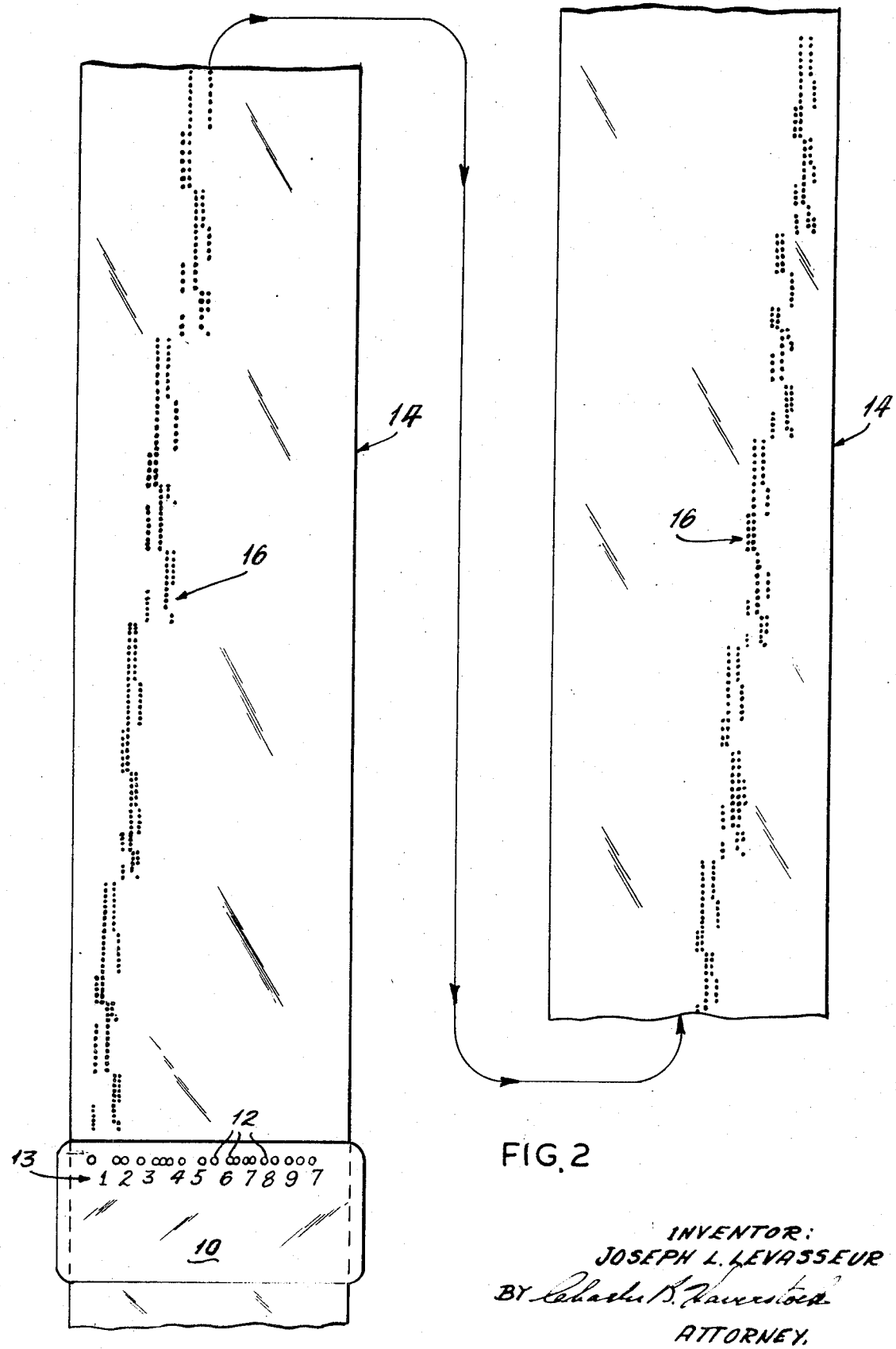
FIG. 2 is a view similar to FIG. 1 but showing the total portion of the coded film necessary to produce the check digit operation.

In the check digit portion of the film strip as disclosed in FIGS. 1 and 2 a particular arbitrary arrangement of the coded opaque areas or dots 16 is included so that as the film strip moves past the read station a predetermined number of outputs will be produced in each digit position depending on what digit is encoded in each digit position. Each match will feed a signal to the Nand gate 39 and to a decade counter 40 where the number of such signals is accumulated. The particular arrangement of the coded areas 16 as shown in FIG. 1 is such that every other digit of the account number, namely, the digits 1, 3, 5, 7, and 9 in the example shown, will employ one formula for producing outputs to represent each digit encoded in those positions, and a different formula will be employed for producing outputs in the even numbered digit positions. The formula for the odd numbered digit positions in the example shown essentially involves doubling the value of the digits in these positions, and if the doubled value exceeds nine outputs the two digits of such sums are added together and the result used instead. For example, a digit 1 in positions 1, 3, 5, 7 and 9 will produce two matched conditions and two outputs, a digit 2 in any one of the same odd digit positions will produce four matched conditions and four outputs, a digit 3 will produce six matched conditions and six outputs, and a digit 4 will produce eight matched conditions and eight outputs. A digit 5 in any of the odd digit positions logically should produce ten outputs, but instead will produce only one matched condition and one output. This is obtained by adding the 1 and 0 digits of the number 10 and producing only one output instead of 10 for a digit 5. In like manner, double a digit 6 in any of the odd digit positions logically should produce twelve outputs but instead produces only three outputs which is obtained by adding the 1 and the 2 of the number 12. In like manner, a digit 7 will produce five outputs, a digit 8 will produce seven outputs and a digit 9 will produce nine outputs. This can be verified in FIG. 2 of the drawing by checking the number of rows of dots corresponding to each of the possible digits from one to nine in the odd digit positions on the check digit portion of the film strip. It is possible to also produce the total actual doubled number of outputs for all of the digits including even for the higher doubled digits but this would make the check digit portion of the film strip unnecessarily long without improving the results.

In the alternate even digit positions of the example shown, namely in the digit positions having the numbers 2, 4, 6 and 8 in them, the film strip is provided with adjacent rows of similar coded areas which correspond to each possible digit that can be encoded in these positions. For example, if there is a one in the second, fourth, sixth or eighth digit positions, a single output or matched condition in those positions will be read and will produce a single output for feeding to the gate 39 and the counter 40. A two in any of the even digit positions will produce two matched conditions and will feed two outputs to the counter 40, a three in any of the even digit positions will produce three matched conditions and three outputs to the counter 40 and so on up to and including a nine digit which will produce nine outputs to the counter. This can be verified by inspecting the film coding for the even digit positions in FIG. 2. In other words, in the odd digit positions of the account number, every digit that is read will have its value either doubled or made equal to the sum of the digits of the doubled value, and the combined values of all these positions will be accumulated in the counter 40, and in the even digit positions only the actual value of each digit that is read will be used to produce outputs for accumulating in the counter 40.

For the particular account number shown in FIG. 1, and using the film encoded formula as described, a total of 43 impulses will be accumulated in the counter 40 during the time it takes for the check digit portion of the film strip to move past the read station. This can be verified by adding the value of the matched conditions that occur as follows, in the four even digit positions the actual values for the digits 2, 4, 6 and 8 will be added making a total of 20, in the first two odd digit positions, twice the value of the digits 1 and 3 or a count of eight will be added and in the last three odd digit positions one matched condition will be produced for the digit 5, five matched conditions for the digit 7 and nine matched conditions for the digit 9. The total of all of these matched conditions is 43.

The last digit of the number encoded in the card is the check digit number which is 7. In the illustrated embodiment this will make seven matched conditions as the film moves through the machine or its value can be added or reset into the counter 40 electronically. The check digit in the example given is the number which when added to the amount accumulated in the counter 40, which is 43 for the account 13 makes a total final count that ends with a zero in the units position and is equivalent in the case illustrated to a final count of 50. This is an arbitrary final count which is selected because it has a zero in its units position. If, after a check digit operation, the counter 40 is left with any number other than a zero in the units position it means there is something wrong with the account number. This may mean that it has been entered in the machine wrong or that the number itself is a wrong number for some reasons. Obviously, if the account number is perforated in the credit card itself as shown in FIG. 1, it cannot be entered into the machine wrongly and the number itself must be a wrong number or else the machine must have malfunctioned, which is possible but unlikely. If the number is entered wrongly, the operator can re-enter it by redialing it or checking to see if he has dialed it correctly.

In the example described, the check digit is selected to make the final result have a zero in the units position. It should be realized, however, that this is not a necessary condition and any desired final count could be used for this purpose. It is important, however, in a device such as that disclosed by applicant's U.S. Pat. No. 3,581,063 to know that each number entered into the machine is a correct number and has been properly entered before performing the other machine operations, and it is also highly desirable to be able to accomplish this without any extra work by the operator. If this is not known then there is no simple way to know with any degree of certainty whether the machine and/or operator acted properly and whether the results of the later operations including the credit verification operation which follows are accurate and reliable.

Every account number that can be assigned to a credit card can be verified by assigning to it a proper check digit number which can be used to check by mathematic calculations along the lines described herein whether the number is an acceptable one. The particular check digit assigned, however, will depend upon values and arrangement of the other digits of the account number and can be determined only after calculations along the lines described above. The important thing is that check digit coding on the film strip 14 be able to verify the accuracy of every account number that is presented. The particular formula and number of matches in each position for each number is widely variable and the example shown is only suggestive of the many possibilities.

The decade counter 40 as shown, has four output connections labeled 42, 44, 46 and 48 all of which are connected to the input of another gate circuit shown as Nor gate 50. The Nor gate 50 has its output connected to a suitable check digit indicator such as light 52 or other means located on the machine. If the check digit operation indicates that an account number is a correct number and/or is correctly entered, the light 52 on the machine will either be energized or prevented from being energized to indicate this condition. If, on the other hand, the check digit operation indicates that the number is erroneous or unacceptable for some reasons such as being a bad account number or entered incorrectly a different output will be produced by the decade counter 40 to energize a different light 54 to indicate this condition. A buzzer or other similar alarm device could also be used. When an error is indicated the operator should check to see if he has entered the number properly, and if not he can make the necessary corrections before performing another check digit operation. If the check digit system fails to indicate an account number is acceptable, it may also operate other means in the machine which will prevent further reading operations from being made and so forth. Hence the check digit means are extremely useful for making sure that only good account numbers are entered and read.

Figure 3:
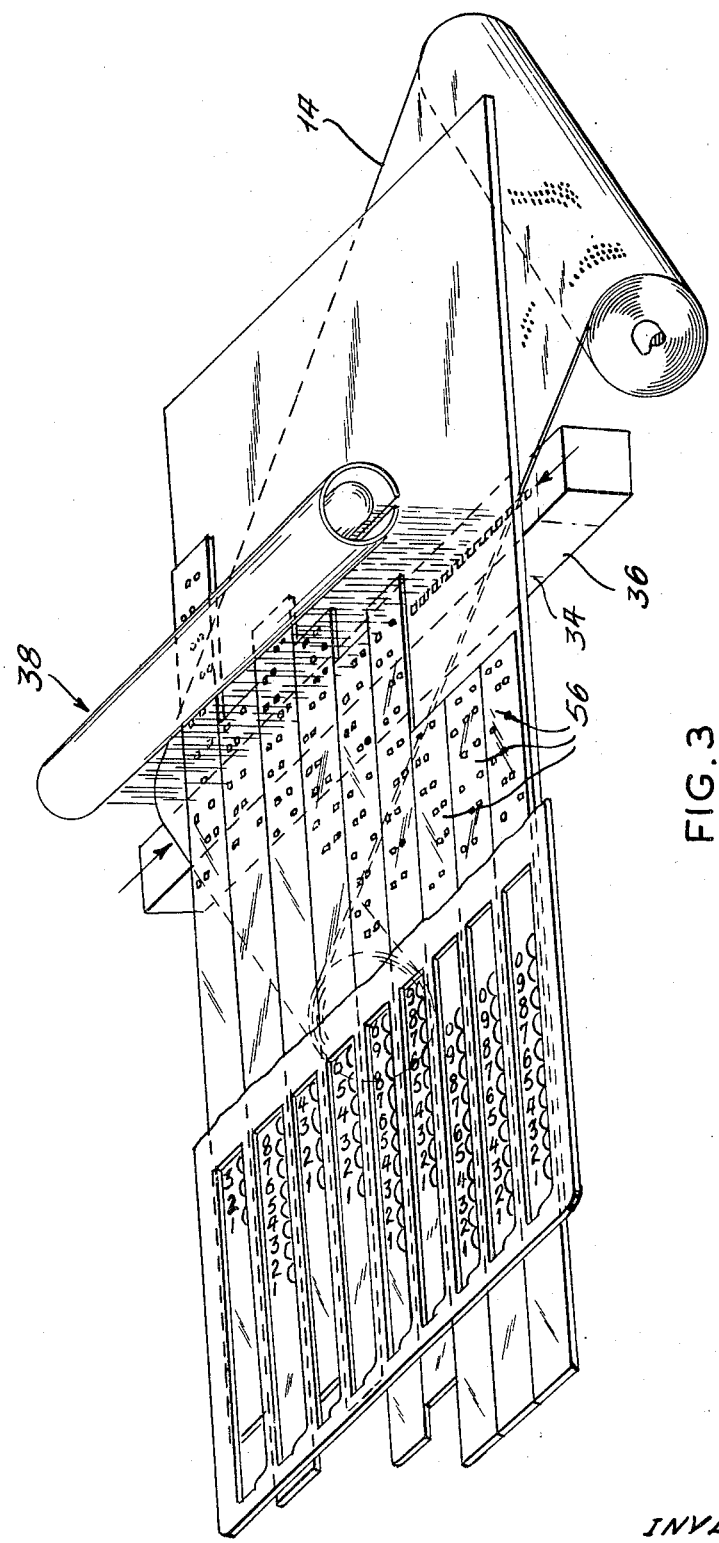
FIG. 3 is a perspective view showing other means for entering an account number including its check digit into the machine; and, FIG. 4 is a view showing account number entry means, a piece of coded film strip and the circuits necessary for producing a transaction authorization operation.

FIG. 3 shows means for entering an account number or other identifier into a machine which do not require that the card itself be perforated. The information entered by the means of FIG. 3 can be used in the same way described above. In the embodiment of FIG. 3, a plurality of perforated slide members 56 are mounted adjacent one another and are individually movable by the operator to positions so that aligned perforations in all of the slides will represent a selected account number. In their moved positions the selected aligned perforations in the slide members 56 establish a row of holes or perforations similar to the row of holes in the credit card 10. The construction and operation of such slide members are shown in FIGS. 7, 12 and 13 of U.S. Pat. No. 3,581,063 and their details will not be described herein. When means such as the slide members are used to enter an account number, it becomes even more important to provide check digit means because the check digit means not only verifies that an account number is an acceptable account number, but it is also verified that the number has been dialed or entered properly by the operator. Obviously, where the holes in the card are used as in the embodiment of FIG. 1, it is not as necessary to provide means to check the accuracy of each entry since the operator has no control over the entry. However, even when a perforated card is used the subject means will catch improperly coded or altered programming or coding on the card.

The subject check digit means have many possible applications in addition to its use in credit transactions involving account numbers and the like. These include any application where the accuracy, including the accuracy of entry of information, is important. This is important in applications such as entry of inventory information, parts list, employer and employee numbers used in payroll, taxes or other accounting applications, and in any application where information is listed or entered in a machine for some purpose. It is also important to recognize that the operations performed and calculations made by the present device are entirely performed and made by means within the machine itself and no connections to outside computers or calculators are required.

FIG. 4 shows a system somewhat similar to the check digit system described above, but which is used instead for transaction authorization and related applications. Transaction authorization, as that term is used herein, refers to calculations made on the digits of an account number or other identifier for the purpose of producing an output key number or symbol which is to be entered or recorded by the person operating the machine usually on a document such as a sales slip or the like so that it can later be used to determine if the operator using the machine used it properly, if the machine, in fact, was used. The output or key number is a number that is calculated by means in the machine that use the information that is entered as the basis for its calculations. Ordinarily the operator will have no way of knowing or calculating the key number except by properly using the machine, and the calculations that are made can be varied from time to time so that the operator who is able to figure out the formula for one case cannot apply it to later cases in order to outsmart or bypass use of the machine. The one processing records at a later date, however, will have means using the key number that has been recorded for determining for each transaction if the key number recorded is the correct key number and if the operator using the machine used it properly.

Referring to FIG. 4 for simplicity the transaction authorization means 100 will be described using a perforated credit card 102 similar to the credit card 10 instead of having means for dialing or otherwise entering the account number. The transaction authorization means can and usually are operated before or after the check digit means in a continuous operation. The card 102 has a row of position encoded holes 104 which may be the same as in card 10, and which are placed in the machine in position to register with the rows of coded areas on the film 106.

The sensor unit used to sense the check digit and other information can also be used to sense information for the transaction authorization means. For example, the sensing unit may include a plurality of sensors 108–126 which may be the same sensors 18–36 but which are shown renumbered to prevent confusion. The sensors 108–126 sense the light that is able to pass through the credit card perforations 104 which are like the perforations 12 and through the film strip 106 which may be the same film strip as the film strip 14. A matched condition as explained above occurs whenever light is momentarily unable to pass through the card to a sensor in any position being read during movement of any one row of the opaque areas on the film strip past the read unit. A matched condition therefore causes a momentary interruption of the light reaching the sensor, and for transaction authorization purposes as for the check digit, reading is limited to the coding for one digit position at a time.

In the transaction authorization embodiment as shown, the alternate odd sensors 108, 112, 116, and 120 are connected to four of five input terminals of a Nand gate 128, and the fifth input terminal to the said gate 128 is selectively connectable to any one of the three sensors 122, 124 or 126 depending on the setting of a three position switch 130. With the switch 130 set as shown, the fifth input is connected to the sensor 124.

The output terminal of the Nand gate 128 is connected to one of two inputs to an Or gate 132, the output of which is connected to the input of a decade counter device 134. The output of the decade counter 134 therefore counts the number of matched conditions sensed in the named digit positions which feed the gate 128 and has an output that is connected to an encoder display device 136 which produces a visual display represented as a number, letter or symbol that is to be recorded by the operator depending on the number of counts accumulated in the counter 134.

The alternate five sensors 110, 114, 118, 122 and 126 are connected to the five input terminals of another Nand gate 138 which has its output connected to the input of another decade counter 140. The output of the counter 140 is connected to another visual display device 142 which produces a second digit which is to be recorded by the operator depending on the count accumulated in the counter 140.

One of the several output connections of the decade counter 140 is connected through a unidirectional device or diode 144 to a second input of the Or gate 132 to increase the count in the decade counter 134 by the number of outputs appearing on this particular output connection of the counter 140. In the embodiment as shown the selected connection is to the tens position output of the counter 140, although any other of the counter output connections could also be used or this particular cross connection could be omitted altogether.

The particular arrangement including the connections of the sensors 108–126 and of the gates, the form and number of gates, and the cross-coupling or scrambling therebetween, can all be varied considerably without changing the basic nature or purpose thereof and depending on the final result that is sought. The switch 130 can be a datewheel switch or the like and it can have more or fewer possible setting positions, and its setting position can be changed from time to time by the machine serviceman or the operator as desired to vary the output results. The possibilities in this regard are limitless and it is also possible to vary the coding on the film strip 106 from time to time to change the results. If the switch 130 is to be set by the operator then the operator should also indicate or record the switch setting each time he records the images on the displays 136 and 142 on the sales slip or other document.

The transaction or credit authorization system as disclosed herein is designed to sense and to count the number of matched conditions that occur as the transaction authorization portion of the film strip 106, which is the portion shown in FIG. 4, moves past the sensing unit. As explained above, a matched condition occurs whenever light is momentarily interrupted in any digit position.

In the example shown, the first groups of coded dots on the film 106 to move past the sensing unit are the dots position encoded to represent the first digit of the account number. The first of these dot rows include five rows or dots each encoded to represent a digit 1; the next three rows of coded dots represent the digit 2; then one row of dots coded to represent a digit 3; followed by four pairs or rows of dots coded to represent a digit 4; then two rows of dots coded to represent a digit 5; no rows are included to represent the digit 6, so that the next five dot rows are encoded to represent the digit 7, followed by one row of dots to represent a digit 8, four rows of dots coded to represent digit 9, and finally two rows of dots encoded to represent 0. All of the above coded information is in the first digit reading position and is followed on the film by similar coding in the second digit position of the account number and so on for all of the digit positions. Since, in the example shown, a digit 1 is encoded by two holes in the first five possible positions of the credit card, this means that five matched conditions and five outputs will occur as the first digit position is read in the transaction authorization portion of the film strip. This will cause five pulses or counts to be entered into the decade counter 134.

In the second digit position on the credit card a digit 2 is encoded by suitably located holes and will be compared with the information complementarily encoded in the second digit position portion of the film strip 106 reserved for the transaction authorization operation. A check of the film strip in FIG. 4 will show that there are five digit 2's encoded in the second digit position and therefore five counts will be entered but this time in the decade counter 140 instead of in counter 134 during reading of the film encoding for the second digit position.

It so happens that for the particular account number selected and for the corresponding encoding on the film strip five matched conditions will be produced in each of the digit positions for a total of 25 counts to be entered into the counter 134 and for a total of twenty counts to be entered into the counter 140. Other account numbers will produce correspondingly different numbers of counts in the counters depending on their digits and the positions thereof. The check digit number shown as a digit 7 ordinarily plays no part in the transaction authorization operation but can be made to do so, if desired. The display devices 136 and 142 which are connected respectively to the outputs of the counters 134 and 140 can be of several different types including devices such as seven segment devices, tens input devices, print out devices or illuminated wire digit display devices, and will produce output indications as already stated that depend on the number of counts accumulated in the respective counters.

The optional gate circuit 144 as indicated above is included to provide intercounter coupling between the counters 140 and 134 in the case shown being connected between the tens output of the counter 140 and the input to the counter 134. The operation of this intercounter coupling is made possible because the reading or entry times of the sensors associated with the different counters are staggered so that only one of the sensors can be reading at any one time during a transaction authorization operation. The relationship between what is displayed by the display devices 136 and 142 and the account number should be, and usually is, such that it is difficult or impossible for the operator to determine from the information at his disposal. The transaction authorization means disclosed herein lend themselves to many applications and uses in addition to those mentioned including providing a handy tool for making inquiries and checking information or gaining access to information for some reason.

One of the important things about the transaction authorization means is that they automatically and without any extra effort by the operator provide a display or output result which is related in some distinctive way to the account number being processed and this relationship can be reestablished during later processing and evaluation but cannot easily be determined by the operator without knowing the details as to how the calculations are made. It is also apparent that every different account number will produce its own distinctive display.

Thus there has been shown and described novel means responsive to information sensed optically to determine if a number or other identifier is an acceptable identifier or number, has been entered properly into a machine by an operator, and that the machine is operating properly, said means also operating to produce a distinctive key number or other identifier which can be used for various purposes such as to evaluate an operator's performance, make machine inquiries into information that has been accumulated for some reasons and used for other purposes, which several means disclosed herein fulfill all of the objects and advantages sought therefor. It should also be apparent from what has been said that many changes, variations, modifications and other uses and applications of the subject means in addition to those described herein are possible and all such changes, variations, modifications and other uses and applications which do not depart from the spirit and scope of the invention are deemed to be covered by the invention which is limited only by the claims which follow.

What is claimed is:

1. Means for determining acceptability and verifying the correctness of entry of a multi-digit identifier comprising means for representing the individual digits of the identifier in a coded optically detectable form, a film strip mounted for movement adjacent to the means representing the individual identifier digits, said film strip having a portion containing optically detectable images complementarily encoded with respect to the coding of the means that represent the digits of the identifier, means for producing relative movement between the film strip and the means representing the identifier digits for making direct optical comparisons between the coding for selected ones of the encoded identifier digits and a corresponding encoded portion of the film strip, each of the encoded portions of the film strip being positioned thereon to be compared individually to the encoding of the identifier for the corresponding digit positions during said relative movement so that optical comparison of encoding for the same digits will prevent light passage, a light source and a light sensor unit positioned on opposite sides of the adjacent encoded means representing the identifier digits and the complementary encoded film strip, said sensor unit having a plurality of distinct sensor elements, each element positioned to respond to any light from the light source that is able to reach it during direct optical comparison of associated encoded digit positions, each of said sensor elements producing an output each time the light from the light source is interrupted during said relative movement, means for counting the number of said outputs produced during said relative movement, and means for combining the number of said outputs with a predetermined number of similar outputs which represent a selected one of the digits of the encoded identifier, said combination having a distinctive predetermined characteristic only when the identifier is an acceptable identifier.

2. The means defined in claim 1 wherein the means encoded to represent the individual digits of the identifier include a credit card having a row formed by adjacent opaque and light conducting areas, the locations of said opaque and light conducting areas being position encoded in said row to represent the digits of the identifier.

3. The means defined in claim 1 wherein the means encoded to represent the individual digits of the identifier include a plurality of adjacent movable members each having a plurality of portions encoded to represent the various possible digits of the identifier, and means for moving said members to establish a row of selected ones of said encoded portions which together represent a particular identifier.

4. The means defined in claim 1 wherein said film strip portion includes a plurality of adjacent light conducting and non-light conducting areas encoded in rows for comparison with the light conducting and non-light conducting areas of the means representing the individual digits of the identifier.

5. The means defined in claim 1 wherein the said selected one of the digits of the identifier is a check digit the value of which depends on the values and arrangements of the other digits of the identifier.

6. The means defined in claim 1 wherein the means representing the individual digits of the identifier in a coded optically detectable form include means for representing the individual digits according to a constant ratio code.

7. The means defined in claim 1 wherein the coding on the film strip portion is arranged to produce a predetermined number of outputs in each digit position of the identifier according to a formula established for each digit position of the identifier as the said coded portion of the film strip moves thereby.

8. The means defined in claim 7 wherein different formulas are established in at least two different individual digit positions of the identifier.

9. The means defined in claim 1 wherein the means for counting the number of outputs produced during movement of said film strip portion include a gate circuit having inputs connected to preselected sensor elements.

10. The means defined in claim 1 wherein the means for counting outputs include at least two gate circuits each having inputs connected to preselected ones of the sensor elements.

11. Means for calculating an identifying indicator based on a formula involving the values and arrangements of the digits of a multi-digit identifier comprising means for representing the individual digits of the identifier in an optically readable encoded form including a form having adjacent light conducting and non-light conducting regions, a strip of film positioned for movement adjacent to said means for representing the digits of the identifier, said film strip having a preselected portion thereof with distinct adjacent light conducting and non-light conducting areas encoded thereon that are registrable with the encoded representations of corresponding ones of the digits of the identifier during movement of the preselected portion of the film strip thereby, the encoding on the film strip being the optical complement of the coding for the identifier, means for producing relative movement between the film strip and the means representing the identifier digits so that each encoded area on the film strip momentarily registers with selected portions only of the encoding for the corresponding digits of the identifier, means for optically comparing the distinct encoded areas on the film strip with the encoding representing the different selected digits of the identifier and for producing an output signal whenever an exact comparison is sensed therebetween in any position as indicated by a momentary blockage of light through the registered and compared encoding, means for counting the output signals that occur during movement of the preselected portion of the film strip past the representation of the multi-digit identifier, and means for producing a visual display indicative of the number of exact comparisons that are counted during said film strip movement.

12. The means defined in claim 11 wherein said means for producing a visual display include means for producing at least a two digit display, each digit of which is based on the number of output signals that occur for different selected groups of the digits of the identifier.

13. The means defined in claim 12 wherein said counting means has separate counter portions for counting output signals that occur for the different selected groups of the digits of the identifier, and means connected between said separate counter portions for feeding selected outputs from one of said counter portions to the other depending on the number of output signals counted by the said one counter portion.

14. The means defined in claim 11 wherein said means for optically comparing and producing output signals include a plurality of light sensitive elements located on one side of the film strip in position to sense light in respective digit positions of the identifier, and at least two gate circuits connected to preselected ones of said light sensitive elements, each of said gate circuits passing output signals sensed by the associated sensor elements to the counting means.

15. The means defined in claim 14 wherein switch means are connected between selected ones of the light sensitive elements and a selected one of the said gate circuits.

16. The means defined in claim 11 wherein the means for representing the individual digits of the identifier include a credit card having adjacent light conducting and non-light conducting areas position encoded thereon.

17. The means defined in claim 11 wherein the means for representing the individual digits of the identifier include a plurality of adjacent optically encoded movable slide members each having a plurality of spaced optically encoded areas thereon that are sufficient to represent all possible digits that can be encoded in the corresponding digit position.

18. The means defined in claim 11 wherein the means for representing the individual digits of the identifier include means for encoding the identifier digits according to a constant ratio code.

19. The means defined in claim 11 wherein the encoding on the film strip is arbitrarily selected to produce any desired number of output signals for each possible identifier digit in each position thereof.

* * * * *